United States Patent [19]

Burhans et al.

[11] 4,434,286
[45] Feb. 28, 1984

[54] CURABLE EPOXY RESIN CONTAINING COMPOSITIONS

[75] Inventors: Allison S. Burhans, Prineville, Oreg.; Orson K. Spurr, Jr., Bridgewater, N.J.

[73] Assignee: Union Carbide Corporation, Danbury, Conn.

[21] Appl. No.: 440,456

[22] Filed: Nov. 10, 1982

Related U.S. Application Data

[63] Continuation of Ser. No. 203,440, Nov. 3, 1980, abandoned.

[51] Int. Cl.$^3$ ............... C08G 59/24; C08G 59/26; C08G 59/62
[52] U.S. Cl. ............... 528/297; 528/110; 528/354; 528/361
[58] Field of Search ............... 528/110, 297, 354, 361, 528/406; 525/407, 415

[56] References Cited

U.S. PATENT DOCUMENTS

| | | | |
|---|---|---|---|
| 2,890,195 | 6/1959 | Phillips et al. | 260/45.4 |
| 3,080,341 | 3/1963 | Chenicek et al. | 260/47 |
| 3,182,099 | 5/1965 | Clark et al. | 525/407 |
| 3,208,955 | 9/1965 | Proops | 260/2 |
| 3,294,865 | 12/1966 | Price | 260/837 |
| 3,318,822 | 5/1967 | Batzer et al. | 260/2 |
| 3,897,514 | 7/1975 | Allabashi | 260/836 |
| 4,086,294 | 4/1978 | Koleske et al. | 525/415 X |
| 4,178,274 | 12/1979 | Denk et al. | 260/31.8 E |

OTHER PUBLICATIONS

Union Carbide Corporation, "Cycloaliphatic Epoxide Systems" (1978).
Union Carbide Corporation, "High Performance Cycloaliphatic Epoxide Systems for Electrical Apparatus" Reprinted from Insulation/Circuits, Jan. 1979.

Primary Examiner—Earl A. Nielsen
Attorney, Agent, or Firm—Gerald L. Coon; Donald M. Papuga

[57] ABSTRACT

Described herein are curable compositions comprising a cycloaliphatic oxide and a compatible amount of a polyol. These compositions can be cast into articles characterized by an excellent balance of physical properties and excellent electrical properties.

16 Claims, No Drawings

CURABLE EPOXY RESIN CONTAINING COMPOSITIONS

This application is a continuation of our prior U.S. application: Ser. No. 203,440 filing date Nov. 3, 1980 now abandoned.

This invention is directed to a curable composition of a cycloaliphatic epoxide and a compatible amount of a polyol.

Cycloaliphatic epoxide resins have inherently good electrical properties. Unmodified cycloaliphatic epoxide resins when cured, however, produce inherently brittle materials. Thus, modifications must be made in the cycloaliphatic epoxide resin systems to decrease their brittleness as well as provide tough systems in order to provide the necessary thermal shock resistance (TSR). Also, resin systems with good electrical properties at elevated temperatures are required in many applications.

The problem, then, becomes one of developing cycloaliphatic epoxide systems with adequate thermal shock resistance while retaining their excellent electrical properties and high heat distortion temperature.

Modification of the cycloaliphatic epoxides with low (<2000) molecular weight flexibilizers showed an averaging effect between the softening point of the unmodified resin and that of the flexibilizer. The result was a moderate improvement in the TSR accompanied by a rather large reduction in the heat distortion temperature.

Thus, a need exists to develop a cycloaliphatic epoxide system with a high TSR, a high heat distortion temperature which retains the excellent electrical properties of the systems.

THE INVENTION

The curable cycloaliphatic containing compositions of this invention which when cast into articles are characterized by an excellent balance of physical properties, high TSR, high heat distortion temperature and good electrical properties.

The compositions of this invention are useful in making electrical components such as, for example, outdoor insulation applications and coil and transformer encapsulation.

The curable cycloaliphatic composition of this invention comprise a cycloaliphatic epoxide and a polyol having a molecular weight of from about 1000 to that molecular weight which does not form a two phase system with the epoxide.

Suitable cycloaliphatic epoxides for purposes of this invention are those having an average of more than one vicinal epoxy group per molecule. The epoxy groups can be terminal epoxy groups or internal epoxy groups as exemplified by the cycloaliphatic epoxides which are subsequently described. Particularly desirable cycloaliphatic epoxides are the cyclohexane diepoxides, that is epoxides having at least one cyclohexane ring to which is attached at least one vicinal epoxy group.

Illustrative of suitable cycloaliphatic epoxides are the following:

FORMULA I

Diepoxides of cycloaliphatic esters of dicarboxylic acids having the formula:

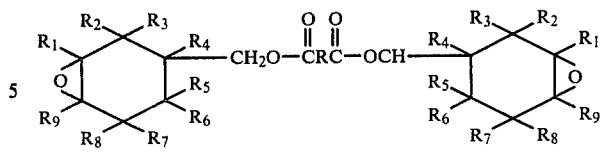

wherein $R_1$ through $R_9$, which can be the same or different are hydrogen or alkyl radicals generally containing one to nine carbon atoms inclusive and preferably containing one to three carbon atoms inclusive as for example methyl, ethyl, n-propyl, n-butyl, n-hexyl, 2-ethylhexyl, n-octyl, n-nonyl and the like; R is a valence bond or a divalent hydrocarbon radical generally containing one to nine carbon atoms inclusive and preferably containing four to six carbon atoms inclusive, as for example, alkylene radicals, such as trimethylene, tetramethylene, pentamethylene, hexamethylene, 2-ethylhexamethylene, octamethylene, nonamethylene, and the like; cycloaliphatic radicals, such as 1,4-cyclohexane, 1,3-cyclohexane, 1,2-cyclohexane, and the like.

Particularly desirable epoxides, falling within the scope of Formula I, are those wherein $R_1$ through $R_9$ are hydrogen and R is alkylene containing four to six carbon atoms.

Among specific diepoxides of cycloaliphatic esters of dicarboxylic acids are the following:
bis(3,4-epoxycyclohexylmethyl)oxalate,
bis(3,4-epoxycyclohexylmethyl)adipate,
bis(3,4-epoxy-6-methylcyclohexylmethyl)adipate,
bis(3,4-epoxycyclohexylmethyl)pimelate, and the like.
Other suitable compounds are described in U.S. Pat. No. 2,750,395 to B. Phillips et al.

FORMULA II

A 3,4-epoxycyclohexylmethyl 3,4-epoxycyclohexane carboxylate having the formula:

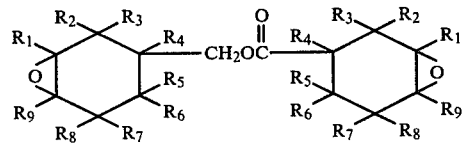

wherein $R^1$ through $R^9$ which can be the same or different are as defined for $R_1$ in formula I. Particularly desirable compounds are those wherein $R^1$ through $R^9$ are hydrogen.

Among specific compounds falling within the scope of Formula II are the following: 3,4-epoxycyclohexylmethyl, 3,4-epoxycyclohexanecarboxylate, 3,4-epoxy-1-methylcyclohexylmethyl, 3,4-epoxy-1-methylcyclohexylmethyl, 3,4-epoxy-1-methylcyclohexanecarboxylate, 6-methyl-3,4-epoxycyclohexylmethyl, 6-methyl-3,4-epoxycyclohexanecarboxylate, 3,4-epoxy-3-methylcyclohexylmethyl, 3,4-epoxy-3-methylcyclohexanecarboxylate, 3,4-epoxy-5-methylcyclohexylmethyl, 3,4-epoxy-5-methylcyclohexanecarboxylate. Other suitable compounds are described in U.S. Pat. No. 2,890,194 to B. Phillips et al.

FORMULA III

Diepoxides having the formula:

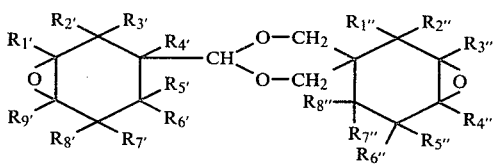

wherein the R single and double primes, which can be the same or different, are monovalent substituents such as hydrogen, halogen, i.e. chlorine, bromine, iodine or fluorine, or monovalent hydrocarbon radicals, or radicals as further defined in U.S. Pat. No. 3,318,822 to Hans Batzer et al. issued May 9, 1967. Particularly desirable compounds are those wherein all the R's are hydrogen.

Other suitable cycloaliphatic epoxides are the following:

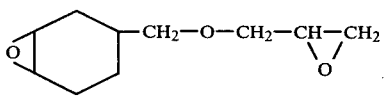

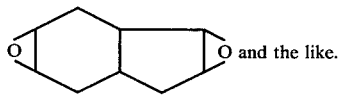 and the like.

The preferred cycloaliphatic epoxides are the following:
3,4-Epoxycyclohexylmethyl-3,4-Epoxy-cyclohexane carboxylate

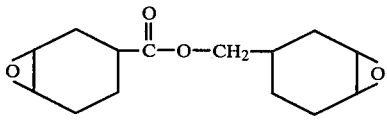

Bis-(3,4Epoxycyclohexylmethyl)Adipate

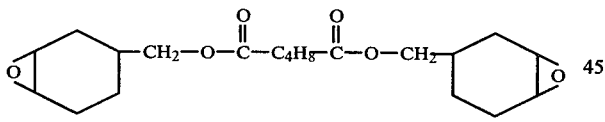

2-(3,4-Epoxycyclohexyl-5,5-spiro-3,4-epoxy)cyclohexane-meta-dioxane

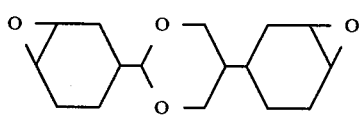

Vinyl cyclohexene Dioxide

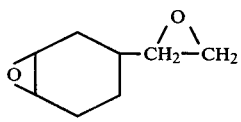

or mixtures thereof.

Epoxides with six membered ring structures may also be used, such as diglycidyl esters of phthalic acid, partially hydrogenated phthalic acid or fully hydrogenated phthalic acid. Diglycidyl esters of hexahydrophthalic acids being preferred.

The glycol suitable for use in this invention has a molecular weight of from about 1000 to that molecular weight which does not form a two phase system with the epoxide, which is about 4000.

The glycols include polycaprolactone polyols as well as alkylene oxide adducts of polyhydroxyalkanes.

Illustrative of the polycaprolactone polyols that can be used one can mention the reaction products of a polyhydroxyl compound having from 2 to 6 hydroxyl groups with caprolactone. The manner in which these polycaprolactone polyol compositions are produced is shown in U.S. Pat. No. 3,169,945 and many such compositions are commercially available. In the following table there are listed illustrative polycaprolactone polyols. The first column lists the organic functional initiator that is reacted with the caprolactone and the average molecular weight of the polycaprolactone polyol is shown in the second column.

Knowing the molecular weights of the initiator and of the polycaprolactone polyol one can readily determine the average number of molecules of caprolactone (CPL Units) that reacted to produce the compound; this figure is shown in the third column.

| | POLYCAPROLACTONE POLYOLS | | |
|---|---|---|---|
| | Initiator | Average MW of polyol | Average No. of CPL Units in molecules |
| 1 | Ethylene glycol | 290 | 2 |
| 2 | Ethylene glycol | 803 | 6.5 |
| 3 | Ethylene glycol | 2,114 | 18 |
| 4 | Propylene glycol | 874 | 7 |
| 5 | Octylene glycol | 602 | 4 |
| 6 | Decalence glycol | 801 | 5.5 |
| 7 | Diethylene glycol | 527 | 3.7 |
| 8 | Diethylene glycol | 847 | 6.5 |
| 9 | Diethylene glycol | 1,246 | 10 |
| 10 | Diethylene glycol | 1,998 | 16.6 |
| 11 | Diethylene glycol | 3,526 | 30 |
| 12 | Triethylene glycol | 754 | 5.3 |
| 13 | Polyethylene glycol (MW 200)* | 713 | 4.5 |
| 14 | Polyethylene glycol (MW 600)* | 1,396 | 7 |
| 15 | Polyethylene glycol (MW 1500)* | 2,868 | 12 |
| 16 | 1,2-Propylene glycol | 646 | 5 |
| 17 | 1,3-Propylene glycol | 988 | 8 |
| 18 | Dipropylene glycol | 476 | 3 |
| 19 | Polypropylene glycol (MW 425)* | 824 | 3.6 |
| 20 | Polypropylene glycol (MW 1000)* | 1,684 | 6 |
| 21 | Polypropylene glycol (MW 2000)* | 2,456 | 4 |
| 22 | Hexylene glycol | 916 | 7 |
| 23 | 2-Ethyl-1,3-hexanediol | 602 | 4 |
| 24 | 1,5-Pentanediol | 446 | 3 |
| 25 | 1,4-Cyclohexanediol | 629 | 4.5 |
| 26 | 1,3-Bis(hydroxyethyl)-benzene | 736 | 5 |
| 27 | Glycerol | 548 | 4 |
| 28 | 1,2,6-Hexanetriol | 476 | 3 |
| 29 | Trimethylolpropane | 590 | 4 |
| 30 | Trimethylolpropane | 761 | 5.4 |
| 31 | Trimethylolpropane | 1,103 | 8.5 |
| 32 | Triethanolamine | 890 | 6.5 |
| 33 | Erythritol | 920 | 7 |
| 34 | Pentaerythritol | 1,219 | 9.5 |

*= Average molecular weight of glycol.

The structures of the compounds in the above tabulation are obvious to one skilled in the art based on the information given. The structure of compound No. 7 is:

wherein the variable r is an integer, the sum of r+r has an average value of 3.7 and the average molecular weight is 527. The structure of compound No. 20 is:

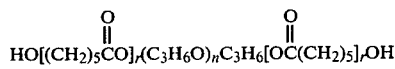

wherein the sum of r+r has an average value of 6 and the average molecular weight is 1,684. This explanation makes explicit the structural formulas of compounds 1 to 34 set forth above.

Illustrative alkylene oxide adducts of polyhydroxyalkanes include, among others, the alkylene oxide adducts of ethylene glycol, propylene glycol, 1,3-dihydroxypropane, 1,3-dihydroxybutane, 1,4-dihydroxybutane, 1,4-1,5- and 1,6-dihydroxyhexane, 1,2-, 1,3-, 1,4-, 1,6-, and 1,8-dihydroxyoctane, 1,10-dihydroxydecane, glycerol, 1,2,4-trihydroxybutane, 1,2,6-trihydroxyhexane, 1,1,1-trimethylolethane, 1,1,1-trimethylolpropane, pentaerylthritol, caprolactone, polycaprolactone, xylitol, arabitol, sorbitol, mannitol, and the like; preferably the adducts of ethylene oxide, propylene oxide, epoxybutane, or mixtures thereof. A preferred class of alkylene oxide adducts of polyhydroxyalkanes are the ethylene oxide, propylene oxide, butylene oxide, or mixtures thereof, adducts of trihydroxyalkanes.

The preferred alkylene oxide adducts of polyhydroxyalkanes are of the following formula:

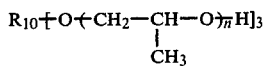

wherein $R_{10}$ is alkane of 3 to 10 carbon atoms, preferably 3 carbon atoms, and n is an integer of from about 4 to about 25.

The polyols constitute from about 10 to about 25 weight percent, preferably from about 10 to about 20 weight percent.

It is customary to add appropriate hardeners to epoxide compositions to effect cure.

Among suitable hardeners are the following:

1. phenolic hardeners having at least 2 phenolic hydroxyl groups and preferably having at least 3 phenolic hydroxyl groups per molecule.
2. polybasic acids having at least 2 carboxylic acid groups per molecule.
3. anhydrides of acids having at least 2 carboxylic acid groups per molecule.

Exemplary of suitable phenolic hardeners are the following polyhydric phenols: catechol, hydroquinone, hydroxyhydroquinone, phloroglucinol, resorcinol and pyrogallol; the di and polynuclear phenols such as the bisphenol is described in Bender et al., U.S. Pat. No. 2,506,486 and polyphenylols such as novolac condensates of a phenol and a saturated or unsaturated aldehyde containing an average of from three to 20 or more phenylol groups per molecule (cf. book by T. S. Carswell and entitled "Phenoplasts," published in 1947 by Interscience Publishers of New York).

Examples of suitable polyphenylols derived from a phenol and an unsaturated aldehyde such as acrolein are the triphenylols, pentaphenylols and heptaphenylols described in U.S. Pat. No. 2,885,385 to A. G. Farnham, issued May 5, 1959.

The phenols may contain alkyl or aryl ring substituents or halogens, as exemplified by the alkyl resorcinols, the tribromo resorcinol and the diphenols containing alkyl and halogen substituents on the aromatic ring (Bender et al., U.S. Pat. No. 2,506,486).

The polyhydric phenols can consist of two or more phenols connected by such groups as methylene, alkylene, ether, ketone, or sulfone. The connecting groups are further exemplified by the following compounds: bis(p-hydroxyphenyl)ether, bis(p-hydroxyphenyl)ketone, bis(p-hydroxyphenyl)methane, bis(p-hydroxyphenyl)dimethyl methane, bis(p-hydroxyphenyl)sulfone and the like.

For purposes of stoichiometric calculations with respect to phenolic hardeners, one phenolic hydroxyl group is deemed to react with one epoxy group.

Illustrative of suitable polybasic acids are the polycarboxylic acids of the formula:

wherein f is an integer generally having a value of from 1 to 20 inclusive, as for example, malonic, glutaric, adipic, pimelic, suberic, azelaic, sebacic and the like. Other examples of suitable acids are phthalic acid, isophthalic acid, terephthalic acid and the like. Further acids are enumerated in U.S. Pat. No. 2,918,444 to B. Phillips et al., issued Dec. 22, 1959.

Among other suitable polybasic acids, having at least two carboxylic groups per molecule, can be noted the following: tricarballylic acid, trimellitic acid and the like. Other such suitable polybasic acids, including polyesters thereof, are described in U.S. Pat. No. 2,921,925 to B. Phillips et al.

Suitable anhydrides are the anhydrides of the acids listed above.

For purposes of stoichiometric calculations with respect to acids, one carboxyl group is deemed to react with one epoxy group; with respect to anhydrides, one anhydride group is deemed to react with one epoxy group.

Preferred hardeners include methyltetrahydrophthalic anhydride, hexahydrophthalic anhydride and methylhexahydrophthalic anhydride.

In an embodiment of this invention, the hardener such as the anhydride may be reacted with the glycol and this reacted product added to the epoxide.

It is to be understood that other additives can be added to the compositions of this invention as is well known in the epoxy art. These additives include the following: catalysts or accelerators, such as amines including (2-hydroxyethyl)trimethyl ammonium hydroxide (45 percent concentration in methanol, known as choline base, benzyl dimethyl amine, 2-methyl imidazole, metallic compounds, such as stannous octanoate, peroxides or ethylene glycol; modifiers such as dimer acid (made from unsaturated $C_{18}$ fatty acids and is a mixture of 3 percent mono basic acids, 75 percent dimer acid and 22 percent trimer acid and sold under the name of Empol 1022 by Emery Industries), a carboxyl terminated butadiene acrylonitrile (80-20) random copolymer having a molecular weight of about 3300; fillers such as clay, silica or aluminum trihydride which may be coated with, for example, silanes, which fillers may be added in amounts of up to about 60 percent; pigments such as carbon black; mold release agents, and the like.

The compositions of this invention are prepared by simply mixing the epoxide, glycol, hardener and other ingredients at room or higher temperatures in a suitable container. Also, the epoxide and glycol may be mixed in one container and the hardener, catalyst and/or accelerator in another container and these two mixed. The composition is then heated in order to effect its cure. The temperature to which the composition of this invention are heated to effect cure will, of course, vary and depend, in part upon the exact formulations of the composition. Generally, temperatures in the range of about 100° C. to about 200° C. are used for a period of time ranging from about 1 to about 6 hours.

EXAMPLES

The following Examples serve to give specific illustration of the practice of this invention but they are not intended in any way to act to limit the scope of this invention.

The following designations used in the Examples have the following meaning:

Epoxy 1: 3,4-epoxycyclohexylmethyl-3,4-epoxycyclohexane carboxylate
Epoxy 2: bis(3,4-epoxycyclohexylmethyl) adipate
Epoxy 3: 2-(3,4-epoxycyclohexyl-5,5-spiro-3,4-epoxy)-cyclohexane-meta-dioxane
HHPA: hexahydrophthalic anhydride
MTHPA: methyltetrahydrophthalic anhydride
Choline base: (2-hydroxy ethyl) trimethyl ammonium hydroxide, 45 percent concentration in methanol.

The procedures used to test the cured composition were as follows:

| Physical Property | Test Method |
|---|---|
| Heat distortion temperature | ASTM D648-72 |
| Thermal shock resistance (TSR) | Union Carbide Corporation Publication F-44429 |
| Tensile strength<br>Elongation at break<br>Tensile modulus | ASTM D-638 |
| Dielectric constant, 60 hertz at 100° C.<br>Dissipation Factor, 60 hertz at 100° C. | ASTM D-150 |

EXAMPLES 1 AND 2 AND CONTROLS A TO D

In these Examples and Controls, the type and amount of epoxide (grams) and type and amount of polyol (grams) as shown in Table I were mixed in a container at about 25° C. In a separate container the amount (grams) of hexahydrophthalic anhydride and the amount (grams) of choline base as shown in Table I were mixed at about 55° C. The contents of the two containers were combined and poured into appropriate molds. The contents of the molds were then heated for 2 hours at 100° C. and then for four hours at 160° C.

The cured composition was then cut into test samples and tested for heat distortion temperature, TSR, tensile strength, elongation, tensile modulus, dielectric constant and dissipation factor. The appearance of the cured composition was noted. An appearance of opacity indicates that a second phase has been formed.

The results are shown in Table I.

TABLE I

| Example | Control A | Control B | Control C | 1 | 2 | Control D |
|---|---|---|---|---|---|---|
| Formulation | | | | | | |
| Epoxy 2 | 208 | 208 | 208 | 208 | 208 | 208 |
| Polyol 1 | 82.8 | — | — | — | — | — |
| Polyol 2 | — | 82.8 | — | — | — | — |
| Polyol 3 | — | — | 82.8 | — | — | — |
| Polyol 4 | — | — | — | 82.8 | — | — |
| Polyol 5 | — | — | — | — | 82.8 | — |
| Polyol 6 | — | — | — | — | — | 82.8 |
| HHPA | 123.2 | 123.2 | 123.2 | 123.2 | 123.2 | 123.2 |
| Choline base | 0.41 | 0.41 | 0.41 | 0.41 | 0.41 | 0.41 |
| Properties | | | | | | |
| appearance | Opaque | Opaque | Opaque | Clear | Clear | Clear |
| Heat distortion temp. (°C.) | 81.0 | 76.2 | 60.0 | 44.2 | 36.1 | ≧25 |
| TSR | 1 | 1 | 1 | 9.0 | 7.7 | 7.3 |
| Tensile strength (psi) | 260 | 1740 | 3170 | 2830 | 2560 | 3280 |
| Elongation (%) | 0.38 | 1.95 | 44.0 | 55.0 | 65.0 | 97.0 |
| Tensile modulus (psi) | 71,200 | 105,000 | 120,000 | 90,700 | 55,200 | 79,500 |
| Dielectric constant | 4.38 | 5.20 | 4.17 | 4.55 | 4.85 | 5.69 |
| Dissipation factor | 0.840 | 0.646 | 0.250 | 0.158 | 0.108 | 0.092 |

Polyol 1: 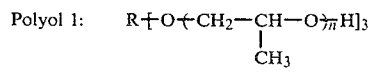

R=propane, having a molecular weight of 6000.
Polyol 2: same formula as Polyol 1 but having a molecular weight of 5,000.
Polyol 3: same formula as Polyol 1 but having a molecular weight of 4,200.
Polyol 4: same formula as Polyol 1 but having a molecular weight of 2,500.
Polyol 5: same formula as Polyol 1 but having a molecular weight of 1,500.
Polyol 6: same formula as Polyol 1 but having a molecular weight of 710.

EXAMPLES 3 AND 4 AND CONTROLS F TO H

In these Examples and Controls, the type and amount of epoxide (grams) and type and amount of polyol (grams) as shown in Table II were mixed in a container at about 25° C. In a separate container the amount (grams) of hexahydrophthalic anhydride and the amount (grams) of choline base as shown in Table II were mixed at about 55° C. The contents of the two containers were combined and poured into appropriate molds. The contents of the molds were then heated for 2 hours at 100° C. and then for four hours at 160° C.

The cured composition was then cut into test samples and tested for heat distortion temperature, TSR, tensile strength, elongation, tensile modulus, dielectric constant and dissipation factor. The appearance of the cured composition was noted.

The results are shown in Table II.

The contents of the molds were then heated for 2 hours at 100° C. and then for four hours at 160° C.

The cured composition was then cut into test samples and tested for heat distortion temperature, TSR, tensile

TABLE II

| Example | Control E | Control F | Control G | 3 | 4 | Control H |
|---|---|---|---|---|---|---|
| Formulation |  |  |  |  |  |  |
| Epoxy 1 | 140 | 140 | 140 | 140 | 140 | 140 |
| Polyol 1 | 65.8 | — | — | — | — | — |
| Polyol 2 | — | 65.8 | — | — | — | — |
| Polyol 3 | — | — | 65.8 | — | — | — |
| Polyol 4 | — | — | — | 65.8 | — | — |
| Polyol 5 | — | — | — | — | 65.8 | — |
| Polyol 6 | — | — | — | — | — | 65.8 |
| HHPA | 123.2 | 123.2 | 123.2 | 123.2 | 123.2 | 123.2 |
| Choline base | 0.33 | 0.33 | 0.33 | 0.33 | 0.33 | 0.33 |
| Properties |  |  |  |  |  |  |
| Appearance | Opaque | Opaque | Opaque | Clear | Clear | Clear |
| Heat distortion temp. (°C.) | 107.2 | 128.9 | 119.2 | 100.1 | 90.1 | 80.3 |
| TSR | 6.5 | 4.5 | 3.1 | 4.9 | 4.7 | 3.0 |
| Tensile strength (psi) | 4530 | 5050 | 4870 | 5320 | 6390 | 8680 |
| Elongation (%) | 5.61 | 5.21 | 3.78 | 5.34 | 4.11 | 2.9 |
| Tensile modulus (psi) | 165,000 | 190,000 | 196,000 | 214,000 | 280,000 | 402,000 |
| Dielectric constant | 6.25 | 4.55 | 3.54 | 3.33 | 3.35 | 3.56 |
| Dissipation factor | 1.091 | 0.758 | 0.253 | 0.030 | 0.025 | 0.043 |

EXAMPLES 5 TO 11

In these Examples, a mixture of epoxides of the type and amount (grams) and Polyol 4 in the amount (grams) as shown in Table III were mixed at about 25° C.

In a separate container the amount (grams) of hexahydrophthalic anhydride and the amount (grams) of choline base as shown in Table III were mixed at about 25° C. The contents of the two containers were combined and poured into appropriate molds. The contents of the mold were then heated for 3 hours at 100° C. and then for four hours at 160° C.

The cured composition was then cut into test samples and tested for heat distortion temperature, TSR, tensile strength, elongation, tensile modulus, dielectric constant and dissipation factor. The appearance of the cured composition was noted.

The results are shown in Table III.

TABLE III

| Example | 5 | 6 | 7 | 8 | 9 | 10 | 11 |
|---|---|---|---|---|---|---|---|
| Formulation |  |  |  |  |  |  |  |
| Epoxy 2 | 156 | 104 | 83.2 | 62.4 | 41.6 | 31.2 | 20.8 |
| Epoxy 3 | 35 | 70 | 84 | 98 | 112 | 119 | 126 |
| Polyol 4 | 83 | 83 | 72.6 | 70.9 | 69.2 | 68.4 | 67.5 |
| HHPA | 123.2 | 123.2 | 123.2 | 123.2 | 123.2 | 123.2 | 123.2 |
| Choline base | 0.40 | 0.40 | 3.6 | 3.5 | 3.5 | 3.4 | 3.4 |
| Properties |  |  |  |  |  |  |  |
| Appearance | Clear | Clear | Clear | Clear | Clear | Clear | Clear |
| Heat distortion temp. (°C.) | 53.2 | 68.7 | 76.6 | 88.4 | 96.9 | 109.5 | 115.7 |
| TSR | 11.1 | 8.0 | 9.7 | 6.7 | 7.3 | 7.3 | 6.9 |
| Tensile strength (psi) | 3580 | 4240 | 4690 | 5120 | 5710 | 5720 | 5990 |
| Elongation (%) | 49.0 | 39.0 | 26.0 | 15.2 | 19.5 | 15.0 | 18.0 |
| Tensile modulus (psi) | 116,000 | 153,000 | 190,000 | 195,000 | 210,000 | 213,000 | 220,000 |
| Dielectric constant | 3.96 | 3.63 | 3.62 | 3.56 | 3.42 | 3.53 | 3.35 |
| Dissipation factor | 0.065 | 0.049 | 0.082 | 0.097 | 0.098 | 0.118 | 0.130 |

EXAMPLES 12 TO 15

In these examples, Epoxy 2 and Polyol 4 in the amounts (grams) shown in Table IV were mixed in a container at about 25° C. In a separate container the amount (grams) of hexahydrophthalic anhydride or methyltetrahydrophthalic anhydride and amount (grams) of choline base as shown in Table IV were mixed at about 25° C. The contents of the two containers were combined and poured into appropriate molds. The contents of the molds were then heated for 2 hours at 100° C. and then for four hours at 160° C.

The cured composition was then cut into test samples and tested for heat distortion temperature, TSR, tensile strength, elongation, tensile modulus, dielectric constant and dissipation factor. The appearance of the cured composition was noted. The percent of polyol 4 in the formulation is also shown.

The results are shown in Table IV.

TABLE IV

| Example | 12 | 13 | 14* | 15 |
|---|---|---|---|---|
| Formulation |  |  |  |  |
| Epoxy 2 | 208 | 208 | 208 | 208 |
| Polyol 4 | 17.9 | 37.8 | 82.8 | 118.2 |
| HHPA | — | — | 123.2 | 126.2 |
| MTPHA | 132.0 | 132.0 | — | — |
| Choline base | 1.9 | 1.9 | 0.41 | 2.27 |
| % of Polyol 4 in composition | 5 | 10 | 20 | 26 |
| Properties |  |  |  |  |
| Appearance | Clear | Clear | Clear | Clear |
| Heat distortion temp. (°C.) | 70.4 | 62.3 | 44.2 | ≧25 |
| TSR | 7.7 | 7.8 | 9.0 | 10.0 |
| Tensile strength (psi) | 800 | 5,590 | 2,830 | 1,360 |
| Elongation (%) | 5.06 | 11.25 | 55.0 | 65.0 |
| Tensile modulus (psi) | 316,000 | 235,000 | 90,700 | 14,200 |
| Dielectric constant | 3.81 | 4.26 | 4.55 | 5.2 |
| Dissipation factor | 0.053 | 0.058 | 0.158 | 0.289 |

*This is the same experiment as Example 1.

What is claimed is:

1. A curable composition comprising a cycloaliphatic epoxide, a polyether polyol having a molecular weight of from about 1000 to that molecular weight which does not form a two-phase system with the epoxide, and a hardener.

2. A curable composition as in claim 1 wherein the cycloaliphatic epoxide has the formula:

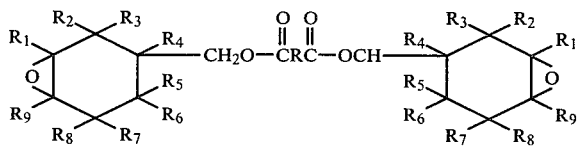

wherein $R_1$ through $R_9$, which can be the same or different are hydrogen or alkyl radicals generally containing one to nine carbon atoms inclusive; R is a valence bond or a divalent hydrocarbon radical generally containing one to nine carbon atoms inclusive.

3. A curable composition as in claim 1 wherein the cycloaliphatic epoxide has the formula:

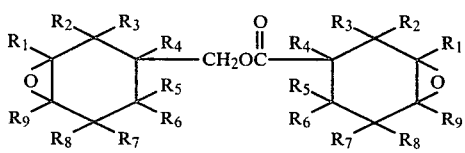

wherein $R_1$ through $R_9$, which can be the same or different are hydrogen or alkyl radicals generally containing one to nine carbon atoms inclusive.

4. A curable composition as in claim 1 wherein the cycloaliphatic epoxide has the formula:

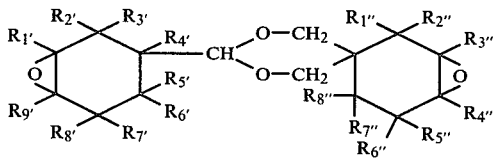

wherein the R groups are the same or different and are monovalent substituents or monovalent hydrocarbon radicals.

5. A curable composition as in claim 1 wherein the cycloaliphatic epoxide is 3,4-epoxycyclohexylmethyl-3,4-epoxy-cyclohexane carboxylate.

6. A curable composition as in claim 1 wherein the cycloaliphatic epoxide is bis(3,4-epoxycyclohexylmethyl)adipate.

7. A curable composition as in claim 1 wherein the cycloaliphatic epoxide is 2-(3,4-epoxycyclohexyl-5,5-spiro-3,4-epoxy)cyclohexane-meta-dioxane.

8. A curable composition as in claim 1 wherein the cycloaliphatic epoxide is a mixture of bis(3,4-epoxycyclohexylmethyl)adipate and 2-(3,4-epoxycyclohexyl-5,5-spiro-3,4-epoxy)-cyclohexane-meta-dioxane.

9. A curable composition as in claim 1 wherein the polyether polyol has a molecular weight of from about 1000 to about 4000.

10. A curable composition as in claim 1 wherein the glycol is an alkylene oxide adduct of a polyhydroxyalkane.

11. A curable composition as in claims 1 or 5 or 6 or 7 or 8 wherein the glycol has the following formula:

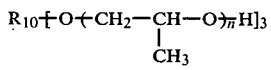

wherein $R_{10}$ is alkane of 3 to 10 carbon aatoms and n is an integer of from about 4 to about 250.

12. A curable composition as in claim 11 wherein R is propane.

13. A curable composition as in claim 1 wherein the polyether polyol is present in amounts of from about 10 to about 20 weight percent.

14. The cured product of the composition defined in claim 1.

15. A curable composition as in claim 1 wherein the hardener is an anhydride of a polybasic acid having at least 2 carboxylic groups per molecule.

16. A curable composition comprising a cycloaliphatic epoxide, a polyether polyol having a molecular weight of from about 1000 to that molecular weight which does not form a two-phase system with the epoxide and a hardener selected from phenolic hardeners having at least two phenolic hydroxyl groups, polybasic acids having at least two carboxylic groups per molecule and anhydrides of such polybasic acids.

* * * * *